No. 642,045. Patented Jan. 23, 1900.
H. G. LOCKE.
MACHINE FOR RUNNING CROSSCUT SAWS.
(Application filed Apr. 7, 1899.)

(No Model.)

Witnesses.
M. P. Blondell
F. L. Stitt

Inventor.
Herbert G. Locke.
By Munn & Co.
Attorneys.

THE NORRIS PETERS CO., PHOTO-LITHO., WASHINGTON, D. C.

UNITED STATES PATENT OFFICE.

HERBERT G. LOCKE, OF UKIAH, CALIFORNIA.

MACHINE FOR RUNNING CROSSCUT-SAWS.

SPECIFICATION forming part of Letters Patent No. 642,045, dated January 23, 1900.

Application filed April 7, 1899. Serial No. 712,190. (No model.)

*To all whom it may concern:*

Be it known that I, HERBERT G. LOCKE, of Ukiah, in the county of Mendocino and State of California, have invented a new and useful Improvement in Machines for Running Crosscut-Saws, of which the following is a specification.

My invention relates to machines for operating crosscut-saws; and it has for its object a device of this character in which the weight of the operator may be advantageously utilized in running the saw and in which the stroke of the saw may be easily regulated.

The invention consists in certain details of construction and combination of the parts, which I shall first describe and then point out the novel features in the appended claims.

Reference is to be had to the accompanying drawings, in which—

Figure 1:
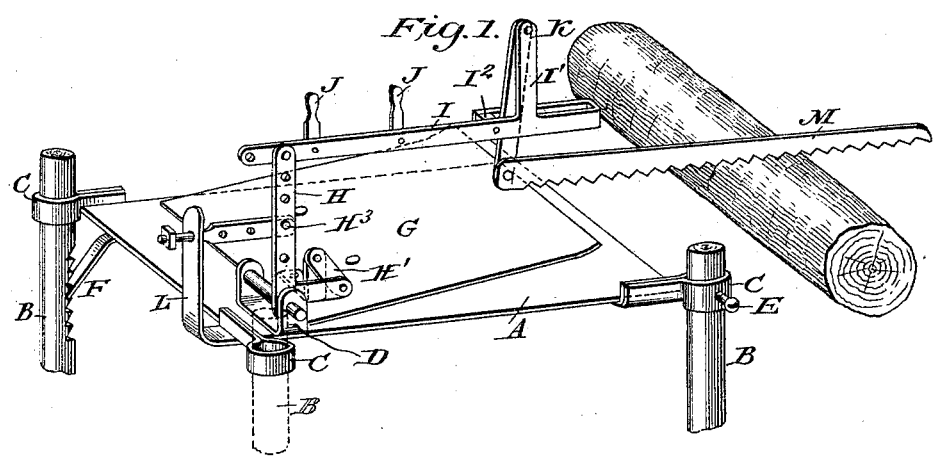
Figure 2:
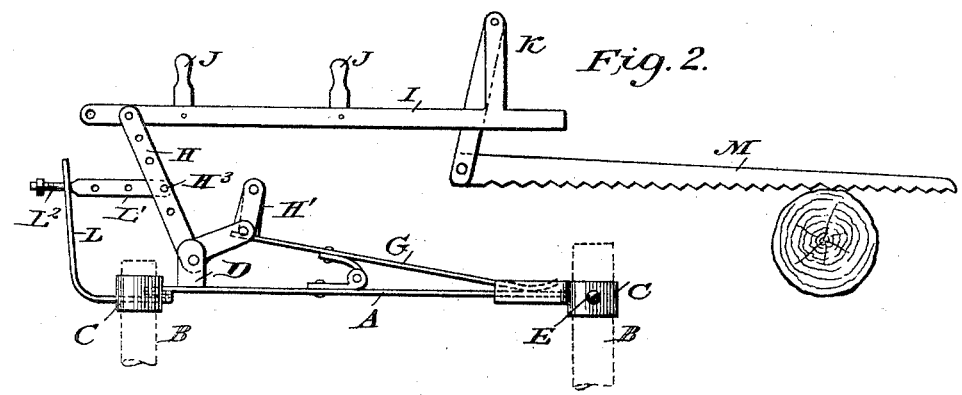

Figure 1 is a perspective view of my improved device. Fig. 2 is a side elevation of the same, and Fig. 3 is a detail view illustrating a modification of the operating-treadle.

The base A of the machine is mounted upon posts B, adapted to be driven in the ground, and is adjustably fitted on said posts by socket-pieces C, in which pins or screws E work, or by a bar F, adapted to engage with teeth on the post. The purpose of adjustably mounting the base on the posts is to enable the former to be supported in a horizontal position when the surface of the ground is uneven or hilly.

Figure 3:
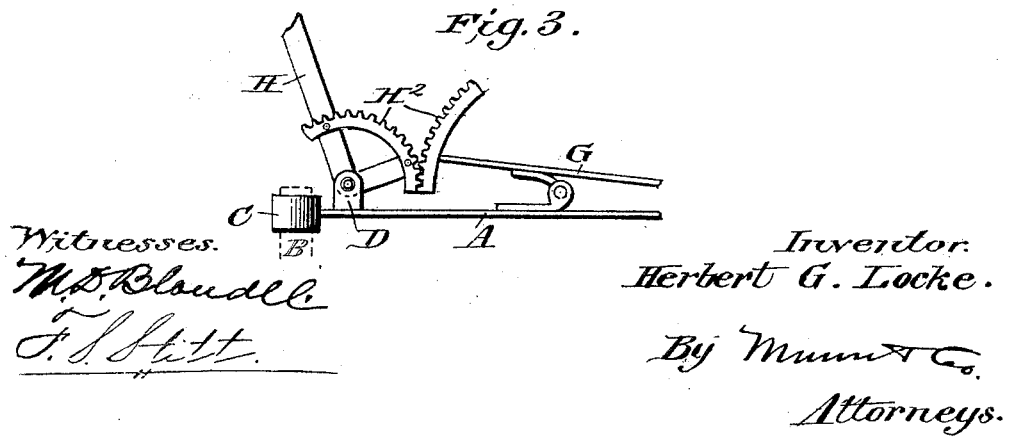

On the base A in upwardly-extending ears D is pivotally mounted the bell-crank lever H, whose short arm is connected by links H', as shown in Figs. 1 and 2, or by toothed sectors $H^2$, as shown in Fig. 3, with a treadle G, pivotally mounted on a spring secured upon the base-plate. A handle-rod I is pivotally connected to the longer arm of said lever H, the said rod carrying handles J J and having an upright arm I' near its free end, which end is bent backward and extended parallel with the main portion of the arm and is connected to such main portion by a short block $I^2$. This forms a guideway in which the rocking saw-carrying lever K, pivotally connected to the upright arm I', is fitted to move.

An L-shaped spring-bracket L is secured to the base in line with the bell-crank lever H, and the bar L' is connected to the longer arm of said lever and has a rod $L^2$ fitted in an aperture in the spring L, being held therein by a nut screwing on the end of the rod. It will be seen that both the bar L' and longer arm of the bell-crank lever H are provided with a plurality of apertures, and these parts are connected together by a detachable pin $H^3$, so that their relative arrangement may be changed to vary the movement of the bell-crank lever and the consequent movement or stroke of the saw; also, that by means of the nut screwing on the end of the rod $L^2$ the length of the latter's sliding movement in the spring may be varied.

In operation the operator stands on the treadle G, facing the handle-rod I, and grasps the handles J J. Then as the rod I is pushed forward the weight of the operator naturally rests on the right foot, which presses the treadle down, and thereby moves the lever H in the same direction as that in which the operator pushes. In this manner increased power is given to the saw-operating devices. As the lever H moves forward it carries the bar L' with it, sliding the rod $L^2$ until its movement is stopped by the nut on its end. Any continued movement will bend the spring-bracket L, and the tension of said bracket is thus utilized to overcome the lost power of the machine, for, as it will be seen, as soon as the stroke is reversed the bracket will, unassisted, give an initial impetus to the handle-rod.

In reversing the stroke of the saw the operator pulls on the handle-rod, which naturally throws his weight on his left foot, which pushes the treadle in a direction opposite to that described above, thereby throwing the bell-crank lever H back. The result is similar though opposite to that accomplished by the operation of pushing the handle-rod forward.

As has been stated, the rod $L^2$ is free to slide in the spring-bracket L within limits governed by the nut on its end, but bends the spring when such limit is reached, thereby causing the spring-bracket to give the initial impetus when the stroke is reversed.

Having thus described my invention, what I claim as new, and desire to secure by Letters Patent, is—

1. In a device for the purpose described, the combination with the base and the bell-crank lever mounted on said base, of a handle-rod connected to said bell-crank lever, and a rocking lever pivotally connected to said handle-rod and having the saw secured thereto, as and for the purpose set forth.

2. In a device for the purpose described, the combination with the posts and the base adjustably supported on said posts, of the bell-crank lever mounted on said base, the treadle mounted on said base and connected with said lever to reciprocate the same, the handle-rod pivotally connected to said lever and provided with an upright arm and a guideway near its free end, and a rocking lever pivoted to said arm and movable in said guideway, such lever being arranged to carry the saw, as and for the purpose set forth.

3. In a device for the purpose described, the combination with the base, of a bell-crank lever mounted on said base, a treadle operatively connected with one arm of said lever, a handle-rod connected to the other arm of said lever, and a rocking lever having one end pivotally connected to said handle-rod and having the saw rigidly secured to its other end as set forth.

4. In a device of the character described, the base, the handle-rod supported above said base and being provided with a guideway closed at both ends and an upright arm extending therefrom between the ends of the guideway means for reciprocating said rod and a rocking lever having one end pivotally connected to the arm of said rod and having the saw rigidly secured to its free end, the said lever extending through said guideway and being limited in its rocking movement by the ends of said guideway, as and for the purpose set forth.

5. In a machine for running a crosscut-saw, the combination with the base, of the saw-reciprocating lever pivotally mounted at its lower end on said base and rising therefrom, a spring-bracket secured to said base and likewise extending upwardly therefrom, a rod having one end secured to the lever and the other end slidable through said bracket, whereby to assist in guiding said lever, and means for limiting the sliding movement of such end in the bracket whereby to bend the latter, as and for the purpose set forth.

HERBERT G. LOCKE.

Witnesses:
ROBERT SNUFFIN,
WM. LUCAS.